United States Patent
Ganapathiappan et al.

(10) Patent No.: US 9,395,639 B2
(45) Date of Patent: Jul. 19, 2016

(54) LIQUID ELECTROPHOTOGRAPHIC INK

(71) Applicant: HEWLETT-PACKARD DEVELOPMENT COMPANY, L.P., Houston, TX (US)

(72) Inventors: Sivapackia Ganapathiappan, Los Altos, CA (US); Hou T. Ng, Campbell, CA (US); Albert Teishev, Rishon le-zion (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/650,282

(22) PCT Filed: Jan. 28, 2013

(86) PCT No.: PCT/US2013/023414
§ 371 (c)(1),
(2) Date: Jun. 5, 2015

(87) PCT Pub. No.: WO2014/116250
PCT Pub. Date: Jul. 31, 2014

(65) Prior Publication Data
US 2015/0316868 A1 Nov. 5, 2015

(51) Int. Cl.
G03G 5/00 (2006.01)
G03G 13/00 (2006.01)
G03G 9/12 (2006.01)
G03G 9/08 (2006.01)
G03G 9/13 (2006.01)
G03G 15/16 (2006.01)
C09D 11/037 (2014.01)
C09D 11/10 (2014.01)
C09D 11/52 (2014.01)

(52) U.S. Cl.
CPC .............. *G03G 9/122* (2013.01); *C09D 11/037* (2013.01); *C09D 11/10* (2013.01); *C09D 11/52* (2013.01); *G03G 9/0804* (2013.01); *G03G 9/131* (2013.01); *G03G 15/16* (2013.01)

(58) Field of Classification Search
CPC ....... G03G 9/122; G03G 15/16; G03G 9/131; G03G 9/0804; C09D 11/10; C09D 11/52; C09D 11/037
USPC ............ 430/109.1, 109.3, 137.22, 117.1, 112
See application file for complete search history.

(56) References Cited

U.S. PATENT DOCUMENTS

| 4,395,485 | A | 7/1983 | Kashiwagi et al. |
| 5,358,822 | A | 10/1994 | Hou |
| 7,105,263 | B2 | 9/2006 | Moudry et al. |
| 7,670,742 | B2 | 3/2010 | Tsubuko et al. |
| 2009/0233209 | A1 | 9/2009 | Daifuku et al. |

(Continued)

FOREIGN PATENT DOCUMENTS

| CN | 1189177 | 7/1998 |
| CN | 101445675 | 6/2009 |

(Continued)

*Primary Examiner* — Thorl Chea
(74) *Attorney, Agent, or Firm* — Dierker & Kavanaugh, P.C.

(57) ABSTRACT

A liquid electrophotographic ink includes a non-polar carrier fluid, a metallic pigment particle, and resin particles. The metallic pigment particle includes a non-functionalized aluminum pigment, and a latex layer directly contacting a surface of the non-functionalized aluminum pigment to encapsulate the non-functionalized aluminum pigment. The resin particles are i) present as discrete particles in the non-polar carrier fluid or ii) associated with the latex layer.

15 Claims, 1 Drawing Sheet

(56) References Cited

U.S. PATENT DOCUMENTS

| | | |
|---|---|---|
| 2011/0123228 A1 | 5/2011 | Roditi et al. |
| 2011/0217650 A1 | 9/2011 | Mor et al. |
| 2012/0114378 A1 | 5/2012 | Golodetz et al. |
| 2012/0196222 A1 | 8/2012 | Chun et al. |

FOREIGN PATENT DOCUMENTS

| | | |
|---|---|---|
| CN | 102089390 | 6/2011 |
| CN | 102827511 | 12/2012 |
| WO | WO-2006/041658 | 4/2006 |
| WO | WO-2012/105951 | 8/2012 |
| WO | WO-2012/105952 | 8/2012 |

LIQUID ELECTROPHOTOGRAPHIC INK

BACKGROUND

The global print market is in the process of transforming from analog printing to digital printing. Inkjet printing and electrophotographic printing are two examples of digital printing techniques. Liquid electrophotographic (LEP) printing is an example of electrophotographic printing. LEP printing combines the electrostatic image creation of laser printing with the blanket image transfer technology of offset lithography. In one example of LEP printing, an ink image is electrostatically transferred from a photo imaging plate (i.e., photoconductor, photoconductive drum, photoreceptor, etc.) to an intermediate drum or roller, and then is transferred to a desirable medium.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in conjunction with other drawings in which they appear.

DETAILED DESCRIPTION

Figure 1:
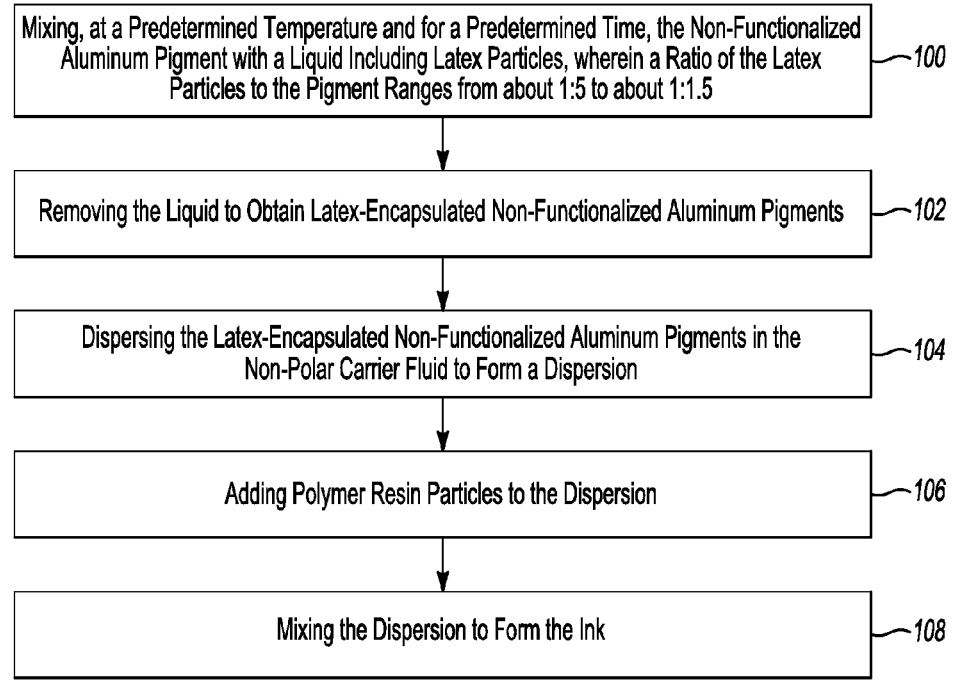
FIG. 1 is a flow diagram illustrating an example of a method for making an example of a liquid electrophotographic ink.

Examples of the ink disclosed herein are suitable for use in a liquid electrophotographic printer. The inks include latex-encapsulated aluminum pigment particles, which exhibit sufficient conductivity (e.g., from about 10 pmho/cm to about 500 pmho/cm) for development in desired printing areas without also developing in undesirable printing areas. The inclusion of the latex layer on a non-functionalized pigment particle (i.e., a bare pigment whose surface does not have additional functional groups attached thereto) is believed to reduce or eliminate the presence of residual pigments in the LEP press (e.g., on the binary ink developer/development/developing (BID) unit, the photoconductive drum, and the blanket drum). The inclusion of the latex layer on the non-functionalized pigment particle also reduces bare pigment to bare pigment contact and provides desirable interfacial interactions between the pigments and resin particles present in the ink. It is believed that these characteristics improve print quality by creating prints with low background.

The LEP ink disclosed herein includes a non-polar carrier fluid, the metallic pigment particles, and the resin particles.

In the examples disclosed herein, the non-polar carrier fluid is a hydrophobic medium that exhibits properties such as low dielectric constant, low odor, lack of color, selective solvency, oxidation stability, low electrical conductivity, low surface tension, desirable wetting, spreadability, low viscosity, narrow boiling point range, non-corrosive to metals, low freezing point, high electrical resistivity, high interfacial tension, low latent heat of vaporization, and low photochemical reactivity. Further, the carrier fluid is selected to have a low field conductivity (e.g., less than 200 pS/cm) so that it does not increase the final conductivity of the ink.

In an example, the non-polar carrier fluid may be chosen from hydrocarbon-based carriers, such as aliphatic (linear/acyclic or cyclic) hydrocarbons, branched-chain aliphatic hydrocarbons, etc. Examples of suitable hydrocarbon carriers include isoparaffinic hydrocarbons, such as ISOPAR® L or ISOPAR® V available from Exxon Mobile Corp., Houston, Tex. Other hydrocarbons that may be used as the non-polar carrier fluid include those bearing the trade name SOLTROL® (available from Chevron Phillips Chemical Company) or SHELLSOL® (available from Shell Chemicals). Dielectric liquids or non-oxidative water immiscible liquids (e.g., petroleum distillates) may also be used if the dielectric constant is suitably low. In another example, the non-polar carrier is an oil, such as silicone oil, soy bean oil, vegetable oil, plant extracts, and/or the like. It is to be understood that a single hydrocarbon carrier or a combination of hydrocarbon carriers may be used, that a single oil or a combination of oils may be used, or that a combination of hydrocarbon(s) and oil(s) may be used.

The amount of the non-polar carrier fluid used depends, at least in part, on the amount of metallic pigment particles and resin particles that are included, and the desired non-volatile solids content of the final ink. In an example, the non-volatile solids content ranges from about 0.5% to about 50% of the ink. The non-polar carrier fluid may be present in any desirable amount up to about 99.5 wt. % of the total wt. % of the ink. In an example of a concentrated form of the ink, from about 10 wt. % to about 50 wt. % of the non-polar carrier fluid may be present. During printing, from about 0.2 wt. % to about 4 wt. % of the non-polar carrier fluid may be present.

The metallic pigment particle includes the non-functionalized aluminum pigment and the latex layer directly contacting a surface of the non-functionalized aluminum pigment. The latex layer fully encapsulates, passivates, etc. the non-functionalized aluminum pigment so that the bare surface of the aluminum pigment is covered.

The non-functionalized aluminum pigment is a bare aluminum pigment that has not been exposed to surface treatments that add functional groups to the surface. The non-functionalized aluminum pigments are untreated aluminum flakes, aluminum beads or spherical aluminum pigments. Examples of the non-functionalized aluminum pigments are available from Sigma-Aldrich, Alcoa, or Alpha Chemical. In an example, the aluminum pigment is equal to or greater than 99% pure aluminum, includes a layer of aluminum oxide on the surface thereof, and is absent of any other resin. In another example, the aluminum pigment is an alloy. The diameter of the non-functionalized aluminum pigment prior to encapsulation may range from about 2 μm to about 20 μm. It may be desirable to utilize non-functionalized aluminum pigments at the lower end of this range due to the partial flattening that occurs during encapsulation.

The non-functionalized aluminum pigment is exposed to an encapsulation process (an example of which is described below) in order to fully encapsulate the pigment with the latex layer. The latex layer may be a homopolymer or a heteropolymer having a glass transition temperature ranging from about 60° C. to about 120° C. The homopolymer or heteropolymer glass transition temperature may also range from about 75° C. to about 90° C. In an example, the latex layer is made up of a homopolymer or a heteropolymer having a glass transition temperature of about 80° C.

The homopolymer (or hydrophobic component of the heteropolymer) may be formed of a monomer that is chosen from methyl methacrylate, butyl acrylate, butyl methacrylate, hexyl acrylate, hexyl methacrylate, 2-ethylhexyl acrylate, 2-ethylhexy methacrylate, lauryl acrylate, lauryl methacrylate, octadecyl acrylate, isobornyl acrylate, isobornyl methacrylate, stearyl methacrylate, ethylene glycol dimethacrylate, diethylene glycol dimethacrylate, triethylene glycol dimethacrylate, pentaerythritol tri-acrylate, pentaerythritol tetra-acrylate, pentaerythritol tri-methacrylate, pentaerythritol tetra-methacrylate, divinylbenzene, styrene, methylstyrene, vinylbenzyl chloride, acrylonitrile, and methacrylonitrile.

The heteropolymer may be formed of at least two of the listed monomers, or one or more of the listed monomers and a hydrophilic monomer, such as acrylic acid or methacrylic acid. An example of the heteropolymer includes styrene, butyl acrylate, methyl methacrylate, and methacrylonitrile as hydrophobic components. This example heteropolymer may also include acrylic acid or methacrylic acid as a hydrophilic component. In the heteropolymer, the hydrophobic component(s) make up from about 90% to about 100% of the polymer. In other examples, the hydrophobic components make up at least 95% or at least 98% of the polymer. Another example of the heteropolymer includes styrene (57.4 wt. %), butyl acrylate (20 wt. %), methacrylonitrile (20 wt. %), methacrylic acid (2 wt. %), and ethylene glycol dimethacrylate (0.6 wt. %).

In an example, the selected monomer(s) is/are polymerized to form the desirable homopolymer or heteropolymer. The monomer(s) is/are not polymerized in situ during the formation of the metallic pigment particles, but rather are polymerized prior to the encapsulation process. Any suitable polymerization process may be used. The homopolymer or heteropolymer is then used in the encapsulation process. In an example, the homopolymer or heteropolymer used in the encapsulation process is present in water that remains from the polymerization process. In another example, water is added to the homopolymer or heteropolymer. In still another example, the homopolymer or heteropolymer is dispersed with an isoparaffinic liquid. When used, the isoparaffinic liquid may make up to 80 wt. % of the dispersion.

In another example, the homopolymer or heteropolymer is commercially available in solution. Some examples of commercially available latex particles include styrene acrylic latex particles of the RAYREZ® family (e.g., RAYREZ® 182A, RAYREZ® 182D, and RAYREZ® 200) and of the RAYKOTE® family (e.g., RAYKOTE® 1589), all of which are available from Specialty Polymers, Inc., Chester, S.C.

The encapsulation process includes mixing, at a predetermined temperature and for a predetermined time, the non-functionalized aluminum pigments with the liquid that includes the latex particles (as shown at reference numeral 100 in FIG. 1). As mentioned above, the liquid may be water or an isoparaffinic liquid. The ratio of the latex particles to the non-functionalized aluminum pigment particles in the mixture ranges from about 1:5 to about 1:1.5. In other words, the amount of latex particles ranges from about 20% to about 150% with respect to the amount of non-functionalized aluminum pigment particles.

A low-shear grinding process is used to mix the non-functionalized aluminum pigments and the latex particles. A low-shear grinding process involves mild agitation or shaking as opposed to vigorous shaking. In an example, the low-shear grinding process is ball milling, which involves shaking or milling the components in the presence of beads. As an example, the non-functionalized aluminum pigments and the latex particles are mixed with zirconia or yttria beads of varying sizes (e.g., from about 2 mm to about 5 mm in diameter) in an attritor at a frequency of rotation ranging from about 30 rpm to about 300 rpm and at a temperature ranging from about −10° C. to about 75° C. until the non-functionalized aluminum pigments are dispersed.

After mixing for a desirable amount of time, the beads and liquid are removed, leaving latex-encapsulated non-functionalized aluminum pigments (i.e., the metallic pigment particles), as shown at reference numeral 102 in FIG. 1. When water is utilized as the liquid, the metallic pigment particles may be separated from the water by forced air circulation, freeze-drying, or another like technique. When an isoparaffinic liquid is used as the liquid, the metallic pigment particles may be separated from the isoparaffinic liquid by filtering or another suitable technique. Liquid removal may be accomplished at a temperature ranging from ambient temperature (e.g., about 20° C.) to about 75° C.

After the non-functionalized aluminum pigment is encapsulated with the latex layer, the resulting metallic pigment particle has a particle size that is equal to or less than 50 μm and exhibits a substantially flat morphology over from about 5 μm to about 15 μm of the particle size. The substantially flat morphology is the result of the initial spherical geometry undergoing mild flattening during the encapsulation process. The substantially flat morphology may be achieved by adjusting the shear. For example, the higher the shear, the shorter the time it will take to at least partially flatten the pigments. The substantially flat morphology is defined by the thickness of the non-functionalized aluminum pigment and the thickness of the latex layer. In an example, the metallic pigment particles exhibits a substantially flat morphology at portions where the non-functionalized aluminum pigment has a thickness ranging from about 50 nm to about 300 nm and where the latex layer has a thickness ranging from about 50 nm to about 1,000 nm. In an example, while a portion of the metallic pigment particles has the substantially flat morphology, the remainder of the particle is nearly spherical or spherical. It is believed that the flat morphology provides desirable reflective properties which lead to prints with a desirable flop index and a desirable silver color, and the spherical morphology renders the particles suitable for LEP printing. The morphology of the resulting metallic pigment particles is readily discernible via scanning electron microscopy.

The separated solid metallic pigment particles are then dispersed in the selected non-polar carrier fluid to form a dispersion (reference numeral 104 in FIG. 1), and polymer resin particles are added to the dispersion, which is mixed to form the LEP ink (reference numerals 106 and 108 in FIG. 1). It is to be understood that the metallic pigment particles and the polymer resin particles may be mixed together and then dispersed in the selected non-polar carrier fluid. Mixing may be accomplished via any desirable process.

The polymer resin particles may be transparent resins chosen from polyethylene, polyester, polyacrylic acid, or polyamide. It is believed that these resin particles impart durability to the ink and also render the ink more compatible with the LEP printing process. In an example, the resin particles have a thickness ranging from about 300 nm to about 20,000 nm. In another example, the resin particles have a thickness ranging from about 5,000 nm to about 15,000 nm. The amount of polymer resin particles that may be added ranges from about 30 wt. % to about 80 wt. % of the non-volatile solids in the ink.

The polymer resin particles may be present as discrete (i.e., non-bonded, non-attached, etc.) particles in the non-polar carrier fluid and/or they may be associated (chemically and/or physically) with the latex layer of the metallic pigment particles.

In an example, the final LEP ink includes the metallic pigment particles (including about 0.7 wt. % of the non-functionalized aluminum pigment and about 0.4 wt. % of the latex layer), about 0.9 wt. % of the resin particles, and about 98 wt. % of the non-polar carrier fluid. Additional dispersants are generally not included in the LEP ink disclosed herein. The viscosity of the LEP ink may be low, ranging from about 0.6 cps to about 10 cps.

Figure 2:
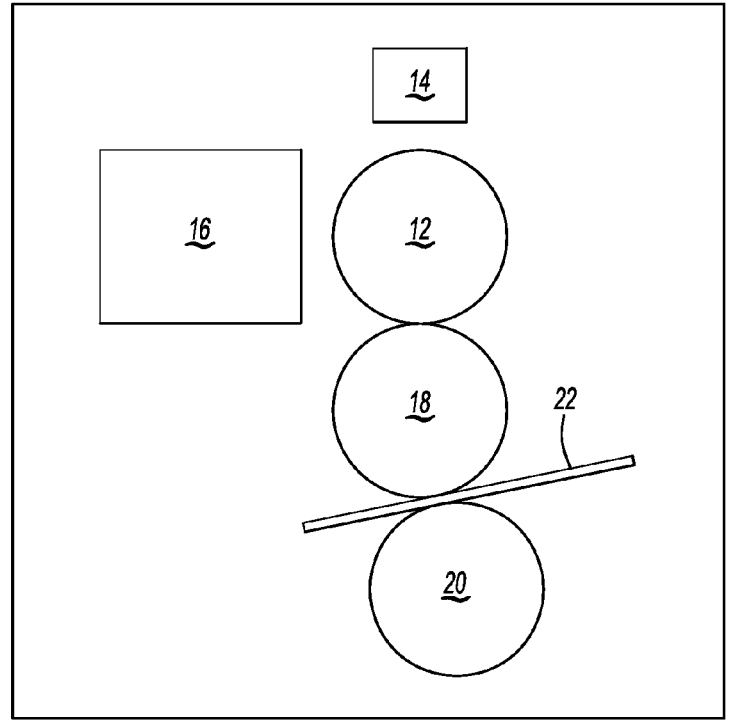
FIG. 2 is a schematic diagram of a liquid electrophotographic printing system for printing examples of the liquid electrophotographic ink disclosed herein.

The LEP ink disclosed herein may be printed using any liquid electrophotographic (LEP) digital printing press. A schematic illustration of an LEP digital printing press is shown in FIG. 2. As illustrated, the LEP digital printing press 10 includes a photoconductive drum 12, a laser source 14, a binary ink development (BID) unit 16, a blanket drum 18, and an impression cylinder 20.

When printing the LEP ink disclosed herein, a latent image is formed on the photoconductive drum 12 using the laser source 14. The laser source 14 selectively charges the photoconductive drum 12 to generate the latent image.

The BID unit 16 applies the LEP ink to a developer roller (which is part of the BID unit). In the process, the BID unit 16 is capable of converting the low viscosity LEP ink to a more usable paste-like layer on the developer roller. In particular, the developer roller accumulates ink solids (i.e., the metallic pigment particles and the resin particles) from the LEP ink disclosed herein, and the resultant layer is compacted, for example, by a squeegee. The paste-like layer on the developer roller of the BID unit 16 is pressed against the photoconductive drum 12 and sticks to the latent image formed thereon. It is to be understood that the developer roller of the BID unit 16 and the photoconductive drum 12 serve as the electrodes between which the paste-like layer is capable of sticking to depending upon the local electric field. Any of the paste-like layer remaining on the developer roller after transfer to the photoconductive drum 12 may be removed, for example, by a cleaning roller. It is to be understood that each step taking place within the BID unit 16 uses an electric field to retain or move ink solids.

The paste-like layer (in the form of the latent image) on the photoconductive drum 12 is then transferred to the blanket drum 18. A medium 22 is directed between the blanket drum 18 and the impression cylinder 20, and the paste-like layer on the blanket drum 18 is transferred to the medium 22 to form the desired print.

To further illustrate the present disclosure, an example is given herein. It is to be understood that this example is provided for illustrative purposes and is not to be construed as limiting the scope of the present disclosure.

EXAMPLE

Three inks were prepared and printed using an HP Indigo 7000 series LEP digital printing press. The first ink (Ink 1) included the latex encapsulated aluminum pigments (i.e., the metallic pigment particles) disclosed herein and the second and third inks (Inks 2 and 3) were comparative examples that did not include the latex encapsulated aluminum pigments. The ink formulations are provided in Table 1.

TABLE 1

| Ingredient | Ink 1 (wt. %) | Ink 2 (wt. %) | Ink 3 (wt. %) |
| --- | --- | --- | --- |
| Al pigment (5 μm beads) | 0.7 | 0.7 | 0.7 |
| Latex (RAYKOTE ® 1589) | 0.42 | 0 | 0 |
| Resin (polyethylene) particles | 0.88 | 1.3 | 1.3 |
| Dispersant (polyamine derivative available from Lubrizol) | 0 | 0.3 | 0 |
| ISOPAR ® L | 98 | 97.7 | 98 |

The inks were tested for their performance in the press operating conditions. The results are provided in Table 2.

TABLE 2

| Parameter | Ink 1 | Ink 2 | Ink 3 |
| --- | --- | --- | --- |
| Best electrode voltage (V) | 1300 | 900 | 900 |
| Best Developer voltage (V) | 600 | 600 | 600 |
| Best squeegee voltage (V) | 775 | 750 | 700 |
| Best Cleaner voltage (V) | 100 | 400 | 450 |
| Flop Index for 200% coverage | 3.7 | 4.6 | 3.3 |
| Background flop index for 200% coverage prints | 0.23 | 0.43 | 0.38 |
| BID performance | No stains on BID | Stains BID | Stains BID |
| Blanket accumulation of inks | Shows no image memory | Shows image memory | Shows image memory |
| Reservoir contamination | No | Yes | Yes |

The voltages in Table 2 represent the operating parameters of the ink binary developing unit in the LEP print engine. For Ink 1, the operating parameters of the various electrodes are relatively wider than for both Inks 2 and 3. The operating parameters for Ink 1 are conducive for achieving desirable ink development and transfer.

Ink 1 also illustrated good BID performance (no stains) with no accumulation of inks in the blanket (i.e., no image memory) and no contamination of the reservoir. The prints generated with Ink 1 also had the lowest background contamination of the inks tested, as indicated by the background flop index data. Comparative inks 2 and 3 did not perform as well in the press and the resulting prints had a higher background image.

It is to be understood that the ranges provided herein include the stated range and any value or sub-range within the stated range. For example, a range from about 50 nm to about 1,000 nm should be interpreted to include not only the explicitly recited limits of about 50 nm to about 1,000 nm, but also to include individual values, such as 50 nm, 100 nm, 300 nm, etc., and sub-ranges, such as from about 100 nm to about 250 nm, from about 50 nm to about 300 nm, etc. Furthermore, when "about" is utilized to describe a value, this is meant to encompass minor variations (up to +/−5%) from the stated value.

While several examples have been described in detail, it will be apparent to those skilled in the art that the disclosed examples may be modified. Therefore, the foregoing description is to be considered non-limiting.

What is claimed is:

1. A liquid electrophotographic ink, comprising:
   a non-polar carrier fluid;
   a metallic pigment particle, including:
      a non-functionalized aluminum pigment; and
      a latex layer directly contacting a surface of the non-functionalized aluminum pigment to encapsulate the non-functionalized aluminum pigment; and
   resin particles that are i) present as discrete particles in the non-polar carrier fluid or ii) associated with the latex layer.

2. The liquid electrophotographic ink as defined in claim 1 wherein the non-functionalized aluminum pigment is an untreated aluminum flake, an aluminum bead, or a spherical aluminum pigment.

3. The liquid electrophotographic ink as defined in claim 2 wherein the non-functionalized aluminum pigment:
- is greater than 99% pure aluminum;
- includes a layer of aluminum oxide on a surface thereof; and
- is absent of any resin.

4. The liquid electrophotographic ink as defined in claim 1 wherein the metallic pigment particle has a particle size that is equal to or less than 50 µm and exhibits a substantially flat morphology over from about 5 µm to about 15 µm of the particle size.

5. The liquid electrophotographic ink as defined in claim 1 wherein:
- the non-functionalized aluminum pigment has a thickness ranging from about 50 nm to about 300 nm;
- the latex layer has a thickness ranging from about 50 nm to about 1,000 nm; and
- the resin particles have a thickness ranging from about 300 nm to about 20,000 nm.

6. The liquid electrophotographic ink as defined in claim 1 wherein the ink has a non-volatile solids content ranging from about 0.5% to about 50%.

7. The liquid electrophotographic ink as defined in claim 1 wherein the latex layer is a homopolymer or a heteropolymer having a glass transition temperature ranging from about 60° C. to about 120° C.

8. The liquid electrophotographic ink as defined in claim 7 wherein:
- the homopolymer is formed of a monomer that is chosen from methyl methacrylate, butyl acrylate, butyl methacrylate, hexyl acrylate, hexyl methacrylate, 2-ethylhexyl acrylate, 2-ethylhexy methacrylate, lauryl acrylate, lauryl methacrylate, octadecyl acrylate, isobornyl acrylate, isobornyl methacrylate, stearyl methacrylate, glycol dimethacrylate, diethylene glycol dimethacrylate, triethylene glycol dimethacrylate, pentaerythritol tri-acrylate, pentaerythritol tetra-acrylate, pentaerythritol tri-methacrylate, pentaerythritol tetra-methacrylate, divinylbenzene, styrene, methylstyrene, vinylbenzyl chloride, acrylonitrile, and methacrylonitrile; or the heteropolymer is formed of at least two of the monomers; or the heteropolymer is formed of at least one of the monomers and a hydrophilic monomer.

9. The liquid electrophotographic ink as defined in claim 8 wherein the heteropolymer is formed from:
- styrene, butyl acrylate, methyl methacrylate, methacrylonitrile, and methacrylic acid; or
- styrene, butyl acrylate, methacrylonitrile, methacrylic acid, and ethylene glycol dimethacrylate.

10. The liquid electrophotographic ink as defined in claim 1 wherein the resin particles are polyethylene, polyester, polyacrylic acid, or polyamide.

11. The liquid electrophotographic ink as defined in claim 1 wherein:
- the non-functionalized aluminum pigment is present in the ink in an amount of about 0.7 wt %;
- the latex layer is present in the ink in an amount of about 0.4 wt. %;
- the resin particles are present in the ink in an amount of about 0.9 wt. %; and
- the non-polar carrier fluid is present in the ink in an amount of about 98 wt. %.

12. The liquid electrophotographic ink as defined in claim 1 wherein the ink is free of an additional dispersant.

13. A method of making the liquid electrophotographic ink as defined in claim 1, the method comprising:
- mixing, at a predetermined temperature and for a predetermined time, the non-functionalized aluminum pigment with a liquid including latex particles, wherein a ratio of the latex particles to the pigment ranges from about 1:5 to about 1:1.5;
- removing the liquid to obtain latex-encapsulated non-functionalized aluminum pigments;
- dispersing the latex-encapsulated non-functionalized aluminum pigments in the non-polar carrier fluid to form a dispersion;
- adding polymer resin particles to the dispersion; and
- mixing the dispersion to form the ink.

14. The method as defined in claim 13 wherein the liquid is water or an isoparaffinic liquid.

15. A printing method, comprising:
- selectively charging a photoconductive drum in correspondence with an image to be formed on a medium;
- applying, using a binary ink development unit, at least solids of the liquid electrophotographic ink as defined in claim 1 to the photoconductive drum where the photoconductive drum has been charged to form a layer;
- transferring the layer to a blanket drum; and
- transferring the layer from the blanket drum to the medium.

* * * * *